US012734986B2

(12) United States Patent
Nag et al.

(10) Patent No.: US 12,734,986 B2
(45) Date of Patent: Sep. 15, 2026

(54) SYSTEMS AND METHODS FOR COLLISION DETECTION AND CLASSIFICATION

(71) Applicant: NETRADYNE, INC., San Diego, CA (US)

(72) Inventors: Anirban Nag, Bengaluru (IN); Nishanth Chandran, Chennai (IN); Pratik Verma, Bengaluru (IN); Jijo Jose, Bangaluru (IN); Borhan Vasli, San Diego, CA (US)

(73) Assignee: NETRADYNE, INC., San Diego, CA (US)

( * ) Notice: Subject to any disclaimer, the term of this patent is extended or adjusted under 35 U.S.C. 154(b) by 0 days.

(21) Appl. No.: 18/865,791

(22) PCT Filed: May 26, 2023

(86) PCT No.: PCT/US2023/023701
§ 371 (c)(1),
(2) Date: Nov. 14, 2024

(87) PCT Pub. No.: WO2023/235251
PCT Pub. Date: Dec. 7, 2023

(65) Prior Publication Data

US 2025/0303994 A1 Oct. 2, 2025

Related U.S. Application Data

(60) Provisional application No. 63/348,064, filed on Jun. 2, 2022.

(51) Int. Cl.
*B60R 21/0132* (2006.01)

(52) U.S. Cl.
CPC .............................. *B60R 21/01332* (2014.12)

(58) Field of Classification Search
CPC ................................................ B60R 21/01332
See application file for complete search history.

(56) References Cited

U.S. PATENT DOCUMENTS 11,862,022 B2 * 1/2024 Petersen .............. G06V 20/597
2012/0265406 A1 * 10/2012 Lang ................... B60R 21/0133
701/45

(Continued)

FOREIGN PATENT DOCUMENTS

WO 2013055487 A1 4/2013
WO 2015121639 A1 8/2015

OTHER PUBLICATIONS

International Search Report and Written Opinion in International Patent Application No. PCT/US23/23701 dated Sep. 18, 2023, 15 pages.

*Primary Examiner* — Steven Lim
*Assistant Examiner* — James E Munion
(74) *Attorney, Agent, or Firm* — FOLEY & LARDNER LLP

(57) ABSTRACT

Disclosed herein are systems and methods for detecting a vehicle collision. A computing device can determine a vehicle event based on inertial sensor data and speed from at least one sensor in a housing inside a cabin of a vehicle, and classify the vehicle event as a collision event or a non-collision event based on the inertial sensor data, the speed, and vehicle class data of the vehicle. The computing device can classify an event subclass of the collision event or the non-collision event based on the inertial sensor data, the speed, and the vehicle class data of the vehicle. The computing device can generate a notification based on the event subclass.

17 Claims, 7 Drawing Sheets

(56) References Cited

U.S. PATENT DOCUMENTS

| | | | | |
|---|---|---|---|---|
| 2016/0094964 | A1* | 3/2016 | Barfield, Jr. ............ | H04W 4/90 340/870.07 |
| 2017/0050599 | A1* | 2/2017 | Gilbert .............. | B60R 21/01332 |
| 2022/0118931 | A1 | 4/2022 | Qi et al. | |

* cited by examiner

205

220

Alerts 205

Sensor data 222

235

Camera 236

Inertial Sensors 237

GPS 238

255

Time of vehicle event 210

Time windows 215

Feature Extraction 218

Inertial Features 225A

GPS Speed Features 225B

Class Information 225C

Feature Transformation 260

Historical Data 265

Artificial Intelligence Models 230

Real-time data 240

Predicted event class 245

Failure Mode Analysis System 250

400

SYSTEMS AND METHODS FOR COLLISION DETECTION AND CLASSIFICATION

CROSS REFERENCE

This application is a U.S. National Phase Application under 35 U.S.C. § 371 of International Patent Application No. PCT/US23/23701, filed on May 26, 2023, which claims the benefit of and priority to U.S. Provisional Patent Application No. 63/348,064, filed on Jun. 2, 2022, and entitled SYSTEMS AND METHODS FOR COLLISION DETECTION AND CLASSIFICATION, the contents of which are incorporated herein by reference in their entireties.

TECHNICAL FIELD

This application relates generally to using machine learning techniques to detect and classify potential vehicle collision events.

BACKGROUND

Vehicles may collide with objects or environmental obstacles during operation. Detecting and cataloging the occurrence of vehicle collision events is important to ensure driver safety. However, it is challenging to both detect and classify vehicle collision events.

SUMMARY

Collision detection can be used to predict driver incident frequency and to identify hazards in certain geographical locations. The systems and methods of this technical solution provide techniques to both detect and classify various collision events and non-collision events (e.g., that may indicate a false positive potential collision event). Additionally, the techniques described herein can detect and classify collision events for different vehicle classes, differentiating between cars, trucks, vans, among other vehicle classes. Collision events can be classified into a respective sub-class that identifies the type of collision event (e.g., rear collision, side collision, etc.) or non-collision event (e.g., speedbump, rapid braking, pothole, etc.). The detected collisions can be stored and utilized to alert drivers of accident-prone regions, as well as identifying hotspots for the detection of false-positive collision events. Alerts identifying the class and subclass of detected collision events can be provided to drivers as they occur. Such alerts may have higher precision and recall in comparison to existing methods for detecting and classifying collision events. Further, event class and subclass information can help tailor a response to a collision event by the driver or by other people, including support personnel. In some embodiments, a notification to a driver of a non-collision event, such as one that may be associated with a similar inertial signature as a collision event, may enable a driver to refocus more quickly on the immediate task of driving the vehicle.

One embodiment is directed to a method of detecting a vehicle collision. The method can be performed, for example, by at least one processor coupled to a non-transitory memory. The method may include determining a vehicle event based on inertial sensor data and speed from at least one sensor in a housing inside a cabin of a vehicle; classifying the vehicle event as a collision event or a non-collision event based on the inertial sensor data, the speed, and vehicle class data of the vehicle; classifying an event subclass of the collision event or the non-collision event based on the inertial sensor data, the speed, and the vehicle class data of the vehicle; and generating a notification based on the event subclass.

Determining the vehicle event may include identifying a time period during which the vehicle event occurred based on the inertial sensor data. The method may include generating a set of features by executing a feature extraction function using at least one of the inertial sensor data or the speed captured during the time period. The method may include classifying the vehicle event as the collision event or the non-collision event based on the set of features. The feature extraction function may comprise a wavelet transform function.

The collision event may comprise at least one of a front collision, a rear collision, a left collision, a right collision, a low-clearance collision, a bird or animal collision, or a topple event, and the non-collision event comprises at least one of a rough road, an icy road, loading or unloading of the vehicle, a bad mount, a speed bump, a hard brake, a hard turn, or a near miss. The method may include identifying a region within which vehicle events are to be classified as non-collision events by executing a clustering technique using a plurality of vehicle events. The method may include identifying a location of the vehicle during the vehicle event. The method may include determining that the vehicle event corresponds to the non-collision event based on the location of the vehicle being within the region.

The method may include updating a size of the region in response to detecting further non-collision events within or proximate to the region. Classifying the event subclass of the collision event may include executing a first classification model, and classifying the event subclass of the non-collision event comprises executing a second classification model. The method may include transmitting the notification to the vehicle to indicate the event subclass to an operator of the vehicle.

Another embodiment is directed to a system for detecting a vehicle collision. The system can include at least one processor coupled to a non-transitory memory. The system can determine a vehicle event based on inertial sensor data and speed from at least one sensor in a housing inside a cabin of a vehicle. The system can classify the vehicle event as a collision event or a non-collision event based on the inertial sensor data, the speed, and vehicle class data of the vehicle. The system can classify an event subclass of the collision event or the non-collision event based on the inertial sensor data, the speed, and the vehicle class data of the vehicle. The system can generate a notification based on the event subclass.

The system may determine the vehicle event by performing operations comprising identifying a time period during which the vehicle event occurred based on the inertial sensor data. The system may generate a set of features by executing a feature extraction function using at least one of the inertial sensor data or the speed captured during the time period. The system may classify the vehicle event as the collision event or the non-collision event based on the set of features. The feature extraction function may include a wavelet transform function.

The collision event may include at least one of a front collision, a rear collision, a left collision, a right collision, a low-clearance collision, a bird or animal collision, or a topple event, and the non-collision event comprises at least one of a rough road, an icy road, loading or unloading of the vehicle, a bad mount, a speed bump, a hard brake, a hard turn, or a near miss. The system may identify a region within which vehicle events are to be classified as non-collision events by executing a clustering technique using a plurality of vehicle events. The system may identify a location of the vehicle during the vehicle event. The system may determine that the vehicle event corresponds to the non-collision event based on the location of the vehicle being within the region.

The system may update a size of the region in response to detecting further non-collision events within or proximate to the region. The system may classify the event subclass of the collision event by performing operations comprising executing a first classification model, and classifying the event subclass of the non-collision event comprises executing a second classification model. The system may transmit the notification to the vehicle to indicate the event subclass to an operator of the vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g., disks) or intangible carrier media (e.g., communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure. For purposes of clarity, not every component may be labeled in every drawing. In the drawings.

DETAILED DESCRIPTION

Figure 1:
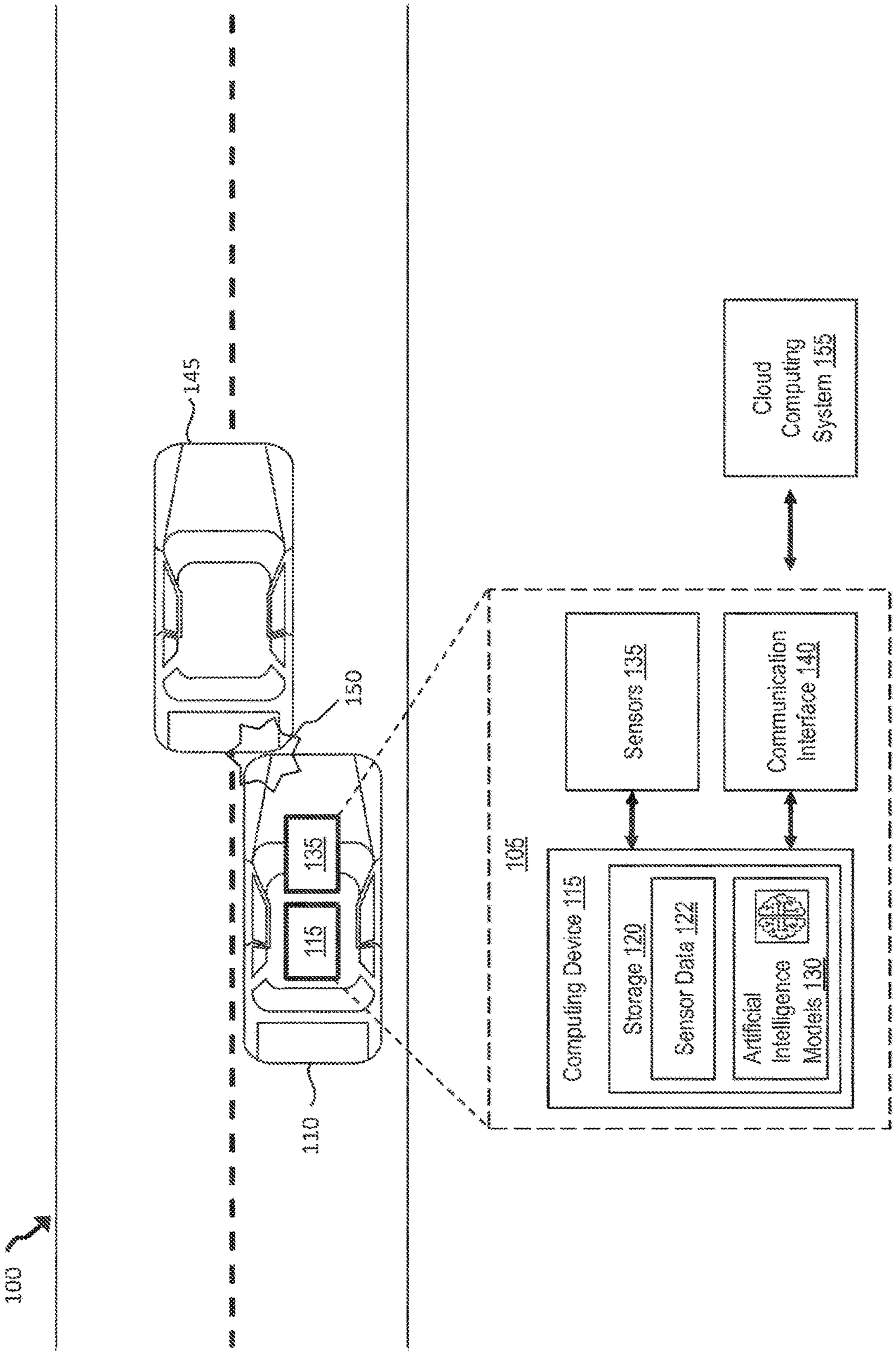
FIG. 1 illustrates an example environment showing a computing system for detecting and classifying vehicle collision and non-collision events, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

The detection of collisions during vehicle operation is important to maintain driver safety and for ensuring proper maintenance of commercial vehicles. The systems and methods described herein provide techniques to both detect and classify various collision events and non-collision events (e.g., that may indicate a false positive potential collision event). These techniques can also be used to aggregate data to identify hazardous areas in which many different collision events occur, or to identify areas in which inertial triggers tend to be associated with non-collision events. In contrast, approaches not implementing the techniques described herein utilize definite and inflexible sets of rules applied on raw telematics data, or information extracted from vibration signatures of sensors mounted on vehicles. Such approaches cannot detect and classify non-collision events or collision events into sub-categories (e.g., types or classes of non-collision or collision events involving the vehicle).

To classify vehicle events, feature extraction techniques can be applied to portions of data that are suspected to indicate the occurrence of a vehicle event, to generate sets of features for multiple sensor types. Artificial intelligence models, which are trained to classify different types of collision events and non-collision events for different vehicle classes, are executed over the extracted features to predict and classify a collision event or a non-collision event. Once a vehicle event has been classified into a sub-class, a corresponding alert can be generated and transmitted to the vehicle to alert the driver of the collision event. Classification of a sub-class of the vehicle event enables creation and provision of a specific notification for the respective sub-class. For example, a notification may specify that the vehicle was hit from the left side, which may then facilitate a more rapid "first notice of loss" response. Additionally, a record of the time and location of the vehicle event can be stored and utilized in post-processing, for example, to identify regions that have a high frequency of collision events or non-collision events. If a region has as high occurrence of non-collision events, alerts may be suppressed if the vehicle event satisfies certain conditions. It will be appreciated that some or all of the present techniques can be implemented on an edge device (e.g., in a computing device in the vehicle) or in connection with a cloud computing system.

The detection and classification of vehicle events can begin by generating features from sensor data captured by sensors mounted on the vehicle. Feature extraction can include segmenting sensor data captured by the sensors based on inertial intensity. If a time-series segment of sensor data (sometimes referred to as a "window") has an inertial intensity above a predetermined threshold, the segment of sensor data can be subjected to further processing at the local computing device, or transmitted to a cloud computing system, to classify the segment into different event classes using trained artificial intelligence models. The predetermined threshold may be based on the vehicle class, such that larger vehicles may have a lower threshold, or more generally, so that the predetermined threshold is set to detect collision events as they are expected to register at the sensor where it is mounted in the vehicle. Given that a safety device enabled with certain aspects of the present disclosure may be installed in a limited range of locations for each type or class of vehicle, and that vehicles of the same class may have a similar mass, a predetermined threshold that is based on a vehicle class may be adequately accurate to ensure that the initial event detection threshold is appropriately sensitive.

Windows of sensor data can be obtained before and after the detection of the inertial intensity that exceeds the threshold, and various features can be generated using the techniques described herein. The features extracted from each of these different time windows can capture patterns associated with the conditions leading to the event, immediate effect of the event and response post the event. Also, features can be extracted from time windows of sensor data that are not in the vicinity (e.g., recorded during a different period of time) of the event, enabling computation of drift from the normal pattern. More generally features extracted from a different period of time may serve as a baseline reference for subsequent classification processing. Several different types of features can be generated or extracted from data captured by different types of sensors, including but not limited to vehicle metadata, inertial data, global positioning system (GPS) data, and video data. For inertial data (e.g., accelerometer and gyroscope data), statistics can be computed in both the time and the frequency domain across the different time windows.

The vehicle events can be labeled into multiple alert classes by providing the extracted features as input to one or more artificial intelligence models. The artificial intelligence models can first classify the vehicle event as a collision event or a non-collision event, and then further classify the collision or non-collision event into an event sub-class. Some examples of event sub-classes for collision events include, but are not limited to, front collisions, back collisions, left collisions, right collisions, top clearance collisions, ground clearance collisions, or bird collisions, among others. Some examples of non-collision event sub-classes include, rough road, a bad mount, a speed bump, loading-unloading of the vehicle, an icy road, a hard brake, a hard turn, or a near miss, among others.

As described herein, the artificial intelligence models can be trained using ground-truth labels assigned to extracted features from sensor data corresponding to known collision or non-collision events. The artificial intelligence models can be or include multiclass classifier(s), which are trained with appropriate model selection and hyperparameter tuning. When training the artificial intelligence models, failure mode analysis can be implemented, in which the sub-classes involving the highest number of misclassifications related to collision events are identified and used as feedback towards feature engineering and model tuning (e.g., changing of model type or hyperparameters, etc.). Properly engineered features based on failure mode analysis along with proper model selection result into a solution with improved detectability of minor and unreported collision events and having both high precision and recall for various collision event sub-classes. For example, a driver may be alerted to a collision that the driver may have failed to notice. In such a case, the driver may be enabled to assist drivers or passengers in another vehicle that participated in the collision. Likewise, the driver may be alerted to having hit a parked vehicle, and the driver would then be enabled to address the situation soon after it occurred. Similarly, where a detected event was noticed by the driver, but the event could be could be confidently classified as a non-collision according to certain disclosed teachings, an alert to the driver may enable the driver to refocus on driving more quickly.

The systems and methods described herein can be utilized for real-time (or near real-time) collision detection, which may be recorded with corresponding sensor data and video evidence. This can assist with the identification of property damage, vehicle damage, or third-party damage. Notifications can be generated and provided to a driver directly from through audio or light indicators, to alert the driver of collision events as they are detected. Notifications can also be transmitted to a cloud computing system for further processing or monitoring, and to enable access to a record of the collision event from other computing devices, such as mobile computing devices.

The systems and methods described herein can determine whether to suppress incorrectly detected collision events based on historical geospatial information. The systems and methods described herein can aggregate characteristics (e.g., location, timing, type, etc.) of collision and non-collision events to identify geospatial "hotspots" in which collision events or non-collision events frequently occur. Such hotspots can indicate regions of routine or repetitive activities, such as loading or unloading at a warehouse, vehicle maintenance at a workshop, a railroad crossing, or a speed bump crossing, among others. The historical geospatial information can also be used to alert vehicle operators when they are driving in an accident-prone zone. Historical geospatial information can be updated at regular intervals, using higher weights for more recently captured data to ensure accuracy.

A computing device can analyze sensor data captured from a vehicle during in a real-time driving environment. In a non-limiting example, the computing device can determine a vehicle event based on inertial sensor data and speed from at least one sensor in a housing inside a cabin of a vehicle and classify the vehicle event as a collision event or a non-collision event based on the inertial sensor data, the speed, and vehicle class data of the vehicle. The computing device can classify an event subclass of the collision event or the non-collision event based on the inertial sensor data, the speed, and the vehicle class data of the vehicle, and can generate a notification based on the event subclass. FIG. 1 depicts an example environment that includes example components of a system in which a computing device can detect and classify vehicle collision and non-collision events. Various other system architectures, such as those described in connection with FIG. 2, and other system architectures that may include more or fewer features may utilize the techniques described herein to achieve the results and outputs described herein. Therefore, the system depicted in FIG. 1 is a non-limiting example.

FIG. 1 illustrates a system 100, which includes components of a vehicle event detection system 105 for detecting and classifying vehicle collision and non-collision events involving a vehicle 110. The system 100 can include the vehicle 110, a vehicle event detection system 105, and a cloud computing system 155. As shown, the system 100 also includes a second vehicle 145, which has collided with the vehicle 110 at the collision 150. The vehicle event detection system 105 can include a computing device 115, one or more sensors 135, and a communication interface 140. The vehicle event detection system 105 may include an alert device, such as an audio alarm, a warning light, or another type of visual indicator. The vehicle event detection system 105 can be mounted on a dashboard or other area inside the vehicle 110. The computing device 115 can include a computer storage 120, which can store the sensor data 122 captured by the sensors 135 and one or more artificial intelligence models 130, which can include one or more classifiers, such as the initial classifier 304, the non-collision classifier 312, and the collision classifier 314 described in connection with FIG. 3. The system 100 is not confined to the components described herein and may include additional or other components, not shown for brevity, which are to be considered within the scope of the embodiments described herein.

The vehicle 110 and the second vehicle 145 can each be any type of vehicle, such as a car, truck, sport-utility-vehicle (SUV), motorcycle, semi-tractor trailer, or other vehicle that can be driven on a road or another environment. The vehicle 110 and the second vehicle 145 can be operated by a user, or in some implementations, can include an autonomous vehicle control system (not pictured) that navigates the vehicle 110 or the second vehicle 145, or provide navigation assistance to an operator of the vehicle 110 or the second vehicle 145. As the vehicle 110 operates on roads, the vehicle 110 may collide with other objects, resulting in events such as the collision 150 with the second vehicle 145. Additionally, the vehicle 110 may encounter other road features that may cause the sensors 135 to record sensor data 122 that exceeds an inertial intensity threshold, but is not a collision event. Such conditions may be, for example, a speed bump, a shallow pothole, an icy road, or a rough road, among other features.

Although the collision 150 is depicted here as a front-end collision (with respect to the vehicle 110), the systems and methods described herein can be utilized to detect and classify any type of collision or non-collision event. Examples of such collision events can include, but are not limited to, rear-end collisions, left collisions, right collisions, top clearance collisions, ground clearance collisions, or bird collisions, among others. Likewise, although the collision 150 is depicted as a vehicle-on-vehicle collision, the systems and methods described herein can be detect and classify any type of collision with any type of environmental obstacle or feature, including deep potholes, under-carriage collisions, or collisions with trees, rocks, or other environmental features.

The vehicle 110 can include the vehicle event detection system 105, which can be used to detect vehicle events and communicate sensor data 122 relating to the vehicle events to the cloud computing system 155. As outlined above, the vehicle event detection system 105 can include a computing device 115. The computing device 115 can include at least one processor and a memory, (e.g., a processing circuit, etc.). The memory (e.g., the storage 120, other computer memory, etc.) can store processor-executable instructions that, when executed by a processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The instructions may include code from any suitable computer programming language.

The computing device 115 can include a storage 120, which can store sensor data 122 captured by the sensors 135, and one or more artificial intelligence models 130 which can include one or more classification models (e.g., the initial classifier 304, the non-collision classifier 312, and the collision classifier 314), as described herein. The storage 120 can be a computer-readable memory that can store or maintain any of the information described herein that is generated, accessed, received, transmitted, or otherwise processed by the computing device 115. The storage 120 can maintain one or more data structures, which may contain, index, or otherwise store each of the values, pluralities, sets, variables, vectors, numbers, or thresholds described herein. The storage 120 can be accessed using one or more memory addresses, index values, or identifiers of any item, structure, or region of memory maintained by the storage 120.

The storage 120 may be internal to the computing device 115 or may exist external to the computing device 115 and accessed via a suitable bus or interface. In some implementations, the storage 120 can be distributed across many different storage elements. The computing device 115 (or any components thereof) can store, in one or more regions of the memory of the storage 120, the results of any or all computations, determinations, selections, identifications, generations, constructions, or calculations in one or more data structures indexed or identified with appropriate values.

The computing device 115 can include a communication interface 140 that can communicate wirelessly with other devices. The communication interface 140 of the computing device 115 can include, for example, a Bluetooth communications device, a WiFi communication device, or a 5G/LTE/3G cellular data communications device. The communication interface 140 can be used, for example, to transmit any information described herein to the cloud computing system 155 (described in further detail in connection with FIG. 2), including indications of detected collision or non-collision events, any features generated based on the sensor data 122, or one or more time-series segments of sensor data surrounding an inertial event detected by the computing device 115. In some implementations, the computing device 115 can utilize the communication interface 140 to communicate any data described herein to the cloud computing system 155, including the sensor data 122. Likewise, the computing device 115 may receive one or more of the artificial intelligence models 130 from a cloud computing system 155 or from another external computing system.

The one or more sensors 135 can include any type of sensor that is capable of capturing information about the operations of the vehicle 110, including but not limited to accelerometers, gyroscopes, magnetometers, inertial measurement units (IMU), GPS receivers, or any other type of inertial sensor. The sensors 135 may also include one or more cameras, which may capture video or periodic still images of the environment surrounding the vehicle 110, or the inside of the vehicle 110. Video or images may be transmitted to other computing devices with the sensor data 122 and may be stored in association with one or more portions of the sensor data 122.

The computing device 115 can use signals captured by the GPS receiver and/or motion sensors (e.g., the sensor data 122) to estimate the speed of the vehicle 110. For example, by periodically accessing GPS measurements from the sensor data 122 and measuring the difference between two position measurements over time, the computing device 115 can estimate an average velocity of the vehicle 110. The GPS measurements can also be used by the computing device 115 to estimate a location, speed, or direction of travel of the vehicle 110, for example, when determining whether the vehicle is traveling toward a region in which accidents or collision events frequently occur. In some implementations, the sensors 135 may be part of the vehicle, and may provide diagnostic information about the operational status of the vehicle via a communications bus, such as a control area network (CAN) bus. The sensors 135 can include brake sensors, which may indicate a timing and intensity of when a driver uses the brake in the vehicle. The sensors 135 can include collision sensors that can record a time and intensity of a collision experienced by the vehicle 110. The sensors 135 may include light detection and ranging (LiDAR) sensors, which may indicate the distance of the vehicle 110 to other vehicles or obstacles in a roadway in front of the vehicle 110.

The sensors 135 may include odometry information, which may indicate patterns or intensity of acceleration performed by a driver in the vehicle. One or more of the sensors can communicate with the computing device 115 via vehicle interface, which may include a CAN bus or an on-board diagnostics interface. The sensors 135 may indicate other signals, such as whether the vehicle 110 is turning, whether the vehicle 110 has a turning indicator activated, an amount of time the vehicle has been operated by the driver in a single session (e.g., without turning the vehicle off), whether the vehicle 110 is braking or accelerating, rapid acceleration events, rapid braking events, vehicle diagnostic information, or other vehicle information (e.g., such as vehicle class information, make or model information, firmware version, among other vehicle information). The vehicle class information may indicate the type and construct of the vehicle, such as sedan, SUV, or a truck). The vehicle class may correspond to a range of typical vehicle weights and other features. For example, a "class 8" vehicle may refer to a truck having a gross vehicle weight rating exceeding 33,000 lbs. Classes may be similarly defined according to local vehicle classification systems that would be known to who install safety devices in vehicles. Accordingly, vehicle class information may be recorded at the time of installation and may be associated with a safety device by various means. The vehicle class information may be stored in a file of the edge device installed in the vehicle and the file includes configuration values that are set at the time of installation to indicate the type of vehicle (i.e., vehicle class information). Additionally, at the time of installation of the edge device to the vehicle, the vehicle class may be inputted in a user interface of the Installer Application and the vehicle class information may be stored in association with the edge device identifier in a cloud server. In some embodiments, vehicle class data may be inferred based on a self-calibration routine that may estimate the height of a camera sensor above the road. Similarly, vehicle class information may be accessed from the vehicle itself. The computing device 115 may receive the information generated by the sensors 135, and store the information in the storage 120 for further processing (e.g., to detect various driving events, etc.). In some implementations, the sensor data 122 captured by the sensors 135 may be transmitted to the cloud computing system 155, for example, in response to a corresponding request.

The sensor data 122 can be captured by the sensors 135 and can be stored in the storage 120 by the computing device 115. The sensor data 122 can include any data captured by any of the sensors 135, and can be stored in association with a corresponding timestamp indicating when the sensor data 122 was captured. The sensor data 122 can therefore be time-series sensor data and may be stored in chronological order. The sensor data 122 can be accessed and processed by the computing device 115 and may be transmitted to the cloud computing system 155 for additional processing. The computing device 115 can store the sensor data 122 from the sensors while the vehicle 110 is operating.

Using the techniques described herein, the computing device 115 can identify one or more windows (e.g., corresponding segments of time) of sensor data 122 that indicate characteristics that satisfy one or more thresholds. For example, the computing device 115 can identify sensor data 122 readings that indicate an inertial measurement that satisfies a threshold. Upon identifying the reading, the computing device 115 can identify window—or time period—surrounding the sensor reading and copy or otherwise extract the sensor data 122 that was captured within that time window. The duration of the time window (e.g., before and after the sensor reading that satisfied the threshold) may be configurable or predetermined. For example, the time window may be predetermined based on analysis of previously detected collisions, resulting in a window span of one second. In another example, the time window may be configurable based on another factor, such as the speed of the vehicle just prior to the detected inertial sensor threshold crossing. In some implementations, the computing device 115 can identify multiple windows of sensor data that immediately precede or follow the time window surrounding the inertial reading that satisfies the threshold. Any identified time windows corresponding to such a sensor reading can either be processed locally (e.g., at the edge device using the techniques described herein), or transmitted to the cloud computing system 155, or process jointly or consecutively by edge and cloud processors.

The computing device 115 can execute the artificial intelligence models 130 to both classify the sensor data 122 as a collision event or a non-collision event, and to classify the collision event or non-collision event into a corresponding sub-class. Using the techniques described herein, the computing device 115 can extract one or more features from the identified windows of sensor data and can execute one or more of the artificial intelligence models using the extracted features as input to generate a classification of the vehicle event. The artificial intelligence models 130 can include a variety of machine learning models, including any type of classification model. Further details of the feature extraction techniques and classification techniques are described in connection with FIGS. 2 and 3.

Upon detecting a collision event using the techniques described herein, the computing device 115 can generate a notification, which can be transmitted to an alert device in the vehicle 110. In implementations where the cloud computing system 155 performs the detection and classification of collision events, the computing device 115 can receive the notification from the cloud computing system 155, and transmit the notification to the alert device. The alert device can be included in the vehicle event detection system 105 and can be a device that alerts a driver of recent collision event involving the vehicle 110. The alert device can output any type of warning signal that alerts the driver to the collision event, including a flashing light or an auditory alarm, among others. In some implementations, the alert device can form a part of the computing device 115 or can form a part of an autonomous vehicle navigation system.

The alert device may include a display device (e.g., a liquid crystal display (LCD), an organic light-emitting diode (OLED) display, etc.) and can present the classification or sub-class of the collision event to the driver. In some implementations, the alert device can be in communication with a display device of the vehicle 110 and can present the classification or sub-class of the collision event on the display of the vehicle 110.

The techniques described herein for detecting and classifying collision events and non-collision events involving a vehicle 110 are described in further detail herein. While some details relating to data processing may be described as being performed by the cloud computing system 155 or the computing device 115, it should be understood that either the computing device 115 or the cloud computing system 155 may perform the techniques described herein. For example, the computing device 115 may include processing circuitry capable of training and executing the artificial intelligence models 130, and may not necessarily communicate with the cloud computing system 155 to carry out any of the data processing or analytical operations described herein. Likewise, operations described as being performed by the computing device 115 may also readily be performed by the cloud computing system 155, in some embodiments.

Figure 2:
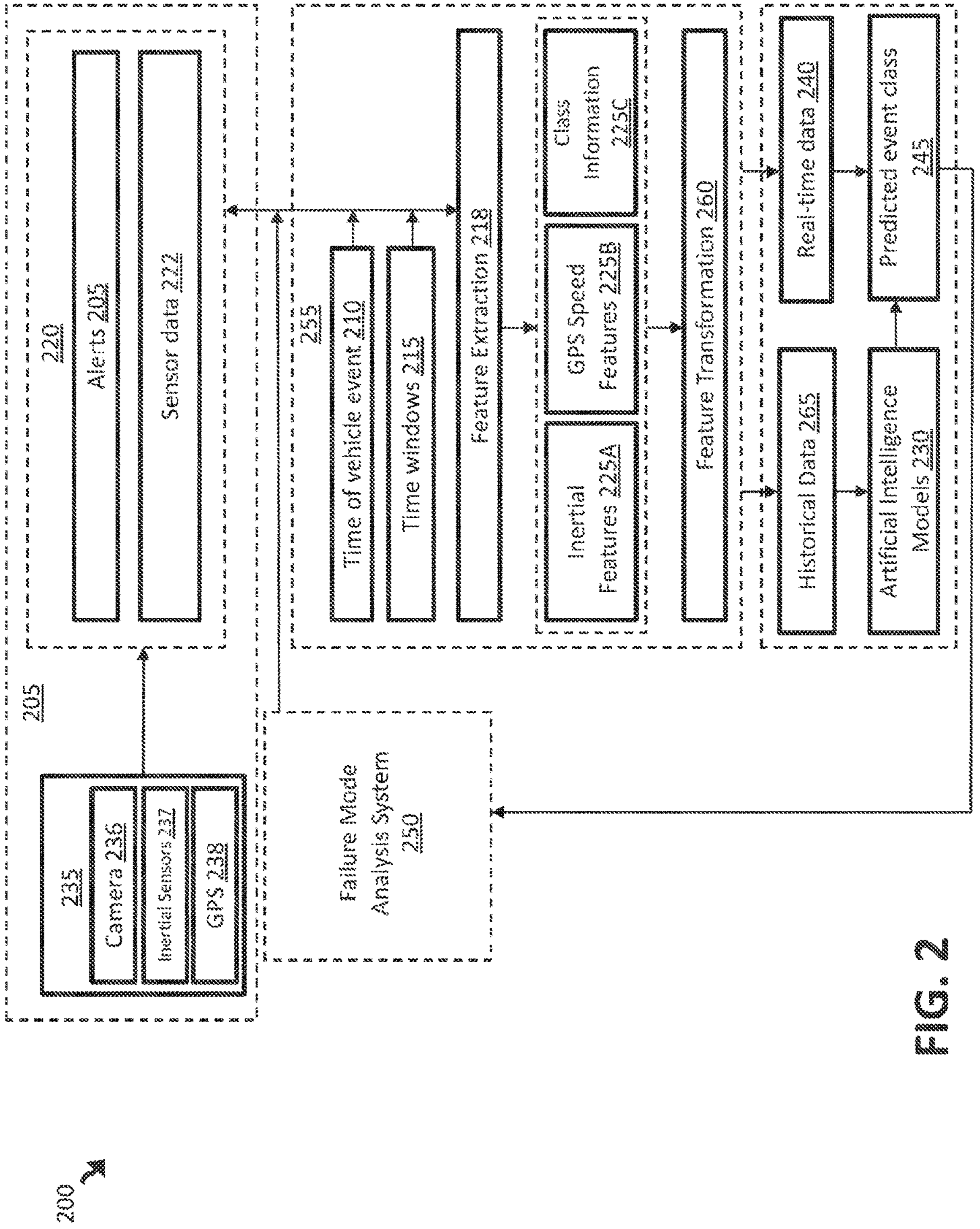
FIG. 2 illustrates a block diagram of an example computing environment for detecting and classifying vehicle collision and non-collision events, according to an embodiment.

Referring to FIG. 2, illustrated is a block diagram of an example computing environment 200 for detecting and classifying vehicle collision and non-collision events, according to an embodiment. The computing environment 200 can be an implementation of the system 100 described in connection with FIG. 1, and certain components of FIG. 1 are omitted here for visual clarity. As shown, the computing environment 200 includes a vehicle event detection system 205 (similar to vehicle event detection system 105), a cloud computing system 255, and may include a failure mode analysis system 250. Although various operations are described in connection with FIG. 2 as being carried out by the vehicle event detection system 205 or the cloud computing system 255, it should be understood that either or both of the vehicle event detection system 205 or the cloud computing system 255 can perform any of the operations described herein.

As shown, the vehicle event detection system 205 includes sensors 235 and storage 220. In the example environment 200, the sensors 235 include a camera 236, one or more inertial sensors 237, and a GPS receiver 238. Data captured through camera 236, the inertial sensors 237 and the GPS receiver 238 can be stored part of the sensor data 222 in the storage 220 and can processed using the computing device 115 of FIG. 1 (not pictured for visual clarity) to detect potential vehicle events. The vehicle event detection system 205 can process stored sensor data 222 to detect vehicle events, for example, by comparing one or more inertial measurements in the sensor data 222 to a predetermined threshold. If the inertial measurement exceeds the threshold, a vehicle event can be detected. Sensor data time windows 215 that correspond to the vehicle event are identified and then transmitted to the cloud computing system 255, along with a timestamp of the detected vehicle event.

To detect a potential collision or non-collision event, the vehicle event detection system 205 can compare the sensor data 222 as it is received from the sensors 235 to one or more inertial thresholds, and store the sensor data 222 in the storage 220. The sensor data 222 may be stored as time-series data in the storage, such that each sensor measurement is associated with a respective timestamp. The timestamps between different types of sensor data can be synchronized.

Upon detecting that sensor data 222 measurement (e.g., an inertial sensor data measurement) exceeds a predetermined threshold, the vehicle event detection system 205 can extract sensor data time windows 215 from before and after the measurement that exceeded the threshold. For example, the vehicle event detection system 205 can identify a center window, which is centered on the measurement, a left window, which is a time window 215 of sensor data that precedes the center window in time, and a right window, which is a time window 215 of sensor data that follows the center window in time. The vehicle event detection system 205 may also identify a "non-event window," which precedes the left window by a predetermined amount of time. Taking the timestamp of the measurement that exceeded the predetermined threshold (e.g., the time of the vehicle event 210) as time t, the vehicle event detection system 205 can extract sensor data for the left, center, right, and non-event time windows 215 as follows:

$$\text{Left window} = [t - 1.5 * wl,\ t - 0.5 * wl];$$

$$\text{center window} = [t - 0.5 * wl,\ t + 0.5 * wl];$$

$$\text{right window} = [t + 0.5 * wl,\ t + 1.5 * wl];\ \text{and}$$

$$\text{Non-event window} = [t - m * wl,\ t - 1.5 * wl],$$

where wl is a predetermined window length (e.g., a window duration), and m is a predetermined multiplier value used to set the width of the non-event window. The values of wl and m may be set on a per-vehicle basis, a per-vehicle class basis, or based on other factors.

Upon calculating the time windows for the sensor data 222 based on the time of the vehicle event 210, the vehicle event detection system 205 can access the sensor data 222 and extract the time series measurements that correspond to each window. To do so, the vehicle event detection system 205 can copy each of the sensor data 122 measurements corresponding to each time window 215 into a respective data structure. The data structures including the sensor data 122 of each time window 215 can then be transmitted to the cloud computing system, along with the time of the vehicle event 210 (e.g., the timestamp of the sensor data 222 measurement that exceeded the threshold). In some implementations, the vehicle event detection system 205 can perform additional feature extraction processing, any may execute one or more artificial intelligence models 230 at the edge, to classify and determine a sub-class for the collision or non-collision event.

Figure 4:
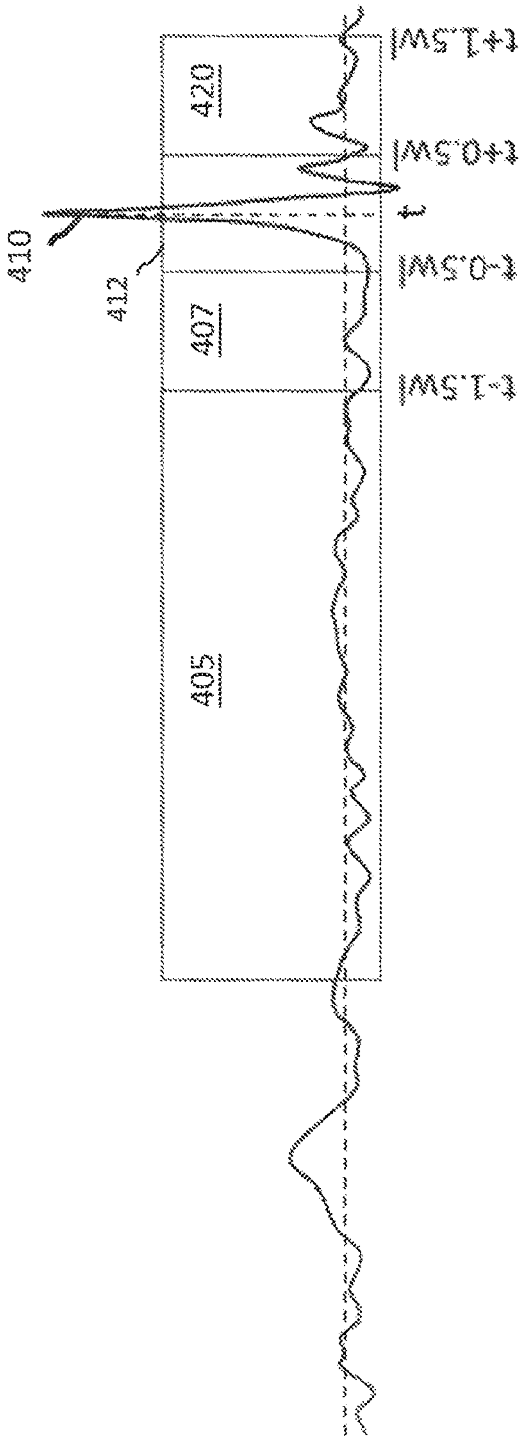
FIG. 4 shows an example time-series graph showing windows of sensor data before, during, and after a potential collision event, according to an embodiment.

An example of time windows 215 calculated from sensor data 222 is shown in FIG. 4. Referring to FIG. 4 in the context of the components described in FIGS. 1 and 2, illustrated is an example time-series graph 400 showing time windows 405, 407, 412, and 420 of the sensor data 222 from before, during, and after the time of a vehicle event 410 (similar to vehicle event 210). As shown, the time of the vehicle event 410 represents a sensor data 222 measurement that is greater than other sensor data 222, indicating an instantaneous (or relatively instantaneous) change in inertial measurements. Upon this value exceeding a threshold, the center window 412 was determined as including sensor data 222 that immediately follows and precedes the time of a vehicle event 210. Then, the left window 407 and the right window 420 are identified based on the techniques described herein. Additionally, the non-event window 405 was identified as a longer period of time preceding the left window 407. Although the non-event window 405 is shown here has corresponding to a longer time period than the left window 407, the center window 412, or the right window 420, it should be understood that the non-event window may also be smaller than or equal to the other time windows.

Using these time windows 215, sensor data 122 is extracted from before and after the occurrence of the vehicle event, and are processed to classify and determine a subclass for the vehicle event. Various time windows 215 can be utilized because the features extracted from each of these different time windows are likely to capture patterns associated with the conditions leading to the event, the immediate effect of the event, and the response following the event. In addition, features are extracted from time windows 215 that are not in the vicinity of the event (e.g., the non-event window 405) to differentiate actual collision events from non-events (e.g., normal driving). As an example, some rough road and bad mount events may be detected as collisions, because the signal around the event is similar to an actual collision event. But the signal not in the vicinity of the event, in the case of a rough road or bad mount, will typically have a noisy signal for a longer time period (e.g., the non-event window 405), whereas a collision would have a noisy signal for a few seconds around the event and a relatively smooth signal in the non-event window 405. As such, features extracted from sensor data 122 captured outside the event windows 407, 412, and 420 can be helpful in differentiating between such scenarios. The sensor data 122 falling within each of the time windows 405, 407, 412, and 420 can be transmitted to the cloud computing system 155 for further processing, processed locally at the edge, or combinations thereof.

Referring back to FIG. 2, the upon receiving the sensor data 222 corresponding to the identified time windows 215 and value of the time of the vehicle event 210, the cloud computing system 255 can perform a feature extraction process 218 to extract the inertial features 225A, the GPS speed features 225B, and the vehicle class information 225C. The vehicle class information 225C may be obtained directly from the vehicle event detection system 205, for example, in response to a request or with the transmission including the time windows 215. In some implementations, the cloud computing system 255 can maintain a lookup table of vehicle classes with corresponding vehicle identifiers. In such implementations, the cloud computing system 255 can receive an identifier of the vehicle and identify the corresponding vehicle class information 225C using the lookup table.

Vehicle class information 225C may be utilized because differences in various features are observed between vehicles of different classes. Some vehicles, such as delivery vans and cars, are generally driven in cities, whereas other vehicles, such as larger trucks, spend considerable time on highways. The nature of vibration or other inertial features can differ from one class of vehicles to another. For example, vibration signature of a trailer hit from the back may be similar to a vibration signature of a rough road event in a car or delivery van.

The feature extraction process 218 can include execution of several different types of feature extraction techniques. The feature extraction techniques can include, but are not limited to, the calculation of time-domain specific features (e.g., median sensor data 222 measurement, the standard deviation of the sensor data 222 measurements, kurtosis of the sensor data 222 measurements, etc.), frequency-domain specific features (e.g., calculated using fast Fourier transform (FFT), the FFT skewness, the FFT kurtosis, the FFT mean, etc.), entropy in both the time domain and the frequency domain, autocorrelation function (ACF) statistics (e.g., aggregation on top of ACF standard deviation, ACF median, etc.), and signal energy (e.g., the root-mean square of the sensor data 222 measurements), among others. Each of these values can be calculated by the cloud computing system 255 for each of the time windows 215 received from the vehicle event detection system 205, for each type of relevant measurement. Each set of extracted features can be stored in association with the respective time window 215 from which the features were generated.

In addition, the cloud computing system 255 can calculate a wavelet transform of the sensor data 222 in the time windows 215. Wavelet transform functions can be used to generate a time-frequency representation of a signal, which may be used for noise reduction, feature extraction, or signal compression. Examples of the outputs of wavelet transform techniques applied to accelerometer and gyroscope sensor data is shown in FIG. 5.

Figure 5:
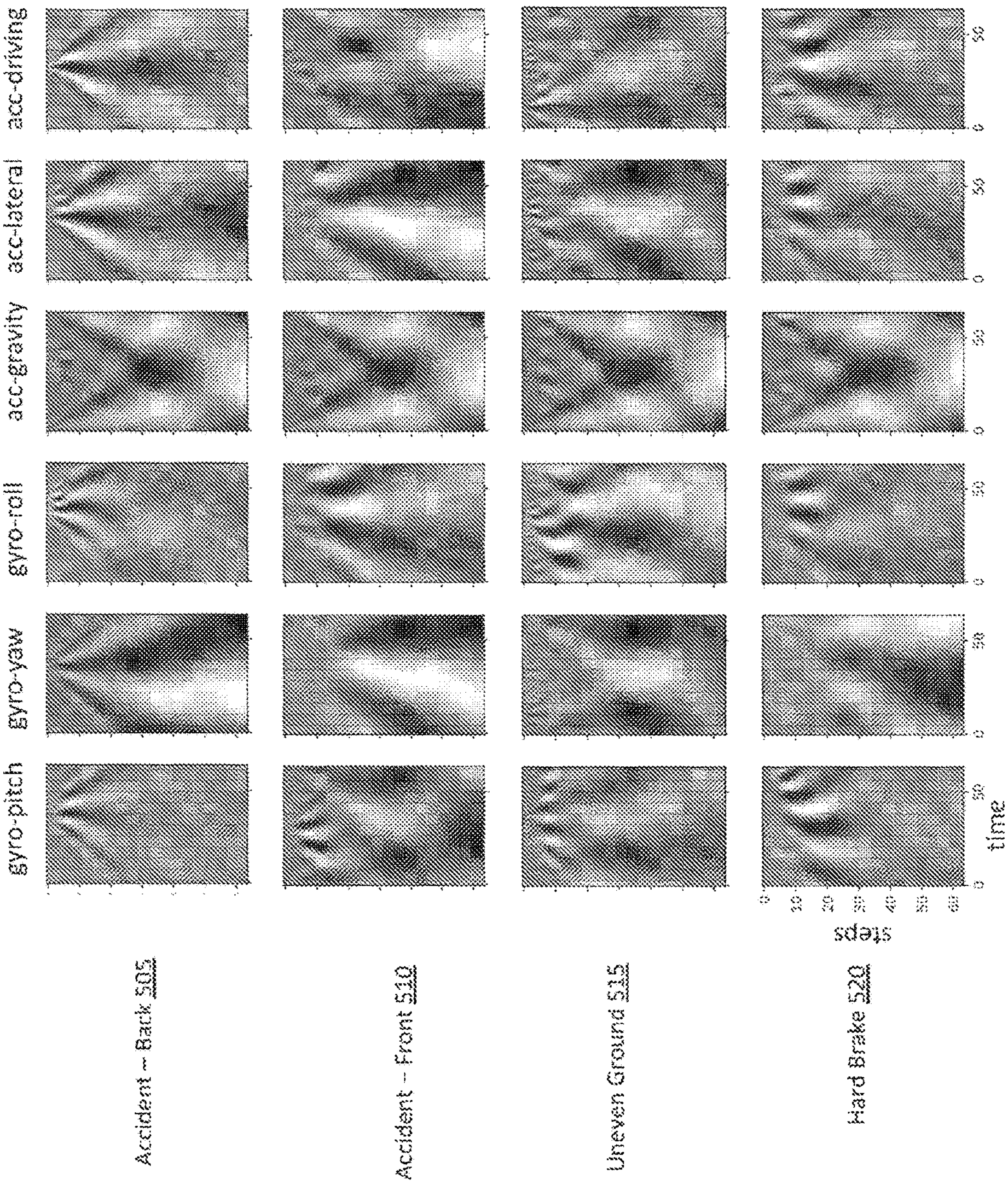
FIG. 5 shows sets of example features generated from sensor data captured during different types of vehicle events, according to an embodiment.

Referring to FIG. 5, and others, illustrated sets of example features generated from sensor data captured during different types of vehicle events, according to an embodiment. As shown, wavelet transforms are provided for sensor data captured during a back-end accident 505, front-end accident 510, an un-even ground event 515 (e.g., rough road), or a non-collision event involving a hard brake 520. The plots represents 6-axis time-series signals from accelerometer and gyroscope sensors, for each event (e.g., the back-end accident 505, the front-end accident 510, the un-even ground event 515, and hard brake 520) transformed to frequency domain by executing a wavelet transform function over the corresponding windows of sensor data. In each plot, the Y-axis represents a parameter S, which is the inverse of the frequency resolution. The X axis in each plot represents the time resolution. A time window around the timestamp of the vehicle event (e.g., the time of the vehicle event 207) having context (e.g., the window length) of plus and minus 2.5 seconds was used. The intensity at each time-frequency resolution is represented as a heatmap with strong white indicating higher spectral intensity and black indicating lower spectral intensities.

Referring back to FIG. 2 in the context of the components described in connection with FIG. 1, each of the various features described herein can be generated as part of the inertial features 225A. The GPS speed features 225B can include similar to those described above, such as the time-domain specific features, frequency-domain specific features, entropy in both the time domain and the frequency domain, ACF statistics, and signal energy, among others. The GPS speed features can be generated for each of the right, center, and left time windows 215. Additionally, the inertial features 225A may be generated to identify more granular information. For example, frequency domain (e.g., FFT) features can be split into low-frequency features (e.g., features in frequencies below a predetermined threshold) and high-frequency features (e.g., features in frequencies above a predetermined threshold). This is because different events may occur at different frequency ranges in the sensor data.

In some implementations, vehicle control input can form a part of the inertial features 225A. As described herein, the sensor data can include information relating to when the vehicle is braking. The inertial features 225A can therefore be generated by the cloud computing system 255 to include time-series indications of whether (and the degree to which) the vehicle was braking during the left, center, and right time windows 215. The braking features can be useful, for example, when differentiating front or rear-end collision events from rough road, speed bump, or bad mount non-collision events. This is because before most front or rear-end collisions, the operator of the vehicle will initiate braking. Additional information may also be included together with the inertial features 225A, which may be based on camera, LiDAR, radar, or CAN Bus sensor streams, including a following distance between the vehicle and another vehicle, traffic congestion information, or information indicating that the vehicle recently changed lanes, or the like. The following distance can be determined, for example, by machine-learning models that execute on the vehicle event detection system, using frames captured by the camera 236 as input.

After generating the inertial features 225A, the GPS speed features 225B, and the vehicle class information 225C (collectively referred to as the "features 225"), the cloud computing system 255 can perform a feature transformation process 260. The feature transformation process 260 can be any suitable process that is used to format the data to be suitable for input to the artificial intelligence models 230. For example, one or more of the features 225 can be normalized to a predetermined range, or can be formatted into a predetermined data structure (e.g., a matrix, a vector, a tensor, etc.) that is suitable to provide as input to the artificial intelligence models 230. The transformed features can then be stored as the historical data 265, which can include historic records of features 225 extracted from past vehicle events. The vehicle events can be stored in the historical data 265 in association with an identifier of the vehicle from which the features 225 were captured.

The historical data 265 can be utilized as training data to train one or more of the artificial intelligence models 230, for example, using a suitable supervised machine-learning algorithm. The historical data 265 can include sets of historical features 225 captured during operation of one or more vehicles. The historical data 265 can include transformed features 225 from several vehicles. In some implementations, ground-truth labels are assigned to each set of features 225 (e.g., which each correspond to a respective vehicle event) in the historical data 265, using a label assignment process. The label assignment process can include manual review and labeling, or/and parsing a report corresponding to the vehicle event from an operator of the vehicle 110, among others. The ground-truth labels can identify the class (e.g., collision event or non-collision event) and sub-class of the vehicle event to which the set of historical features 225 corresponds. The sets of historical data 265, with the ground-truth labels, can be used in a supervised learning process to train one or more of the artificial intelligence models 230. Details of the training process are described in further detail in connection with FIG. 3.

The artificial intelligence models 230 can be any type of classification model that may be trained using supervised, unsupervised, or semi-supervised machine learning techniques. Some non-limiting examples of trained classifiers may include light gradient boosting machine (LightBGM) models, Extreme Gradient Boosting (XGBoost) models, Naïve Bayes classifiers, logistic regression classifiers, neural networks (e.g., fully connected networks, recurrent neural networks (RNN), convolutional neural networks (CNN), combinations thereof, etc.), sparse vector machine (SVM) classifiers, random forest classifiers, and decision tree classifiers, among others. The cloud computing system 255 can train the artificial intelligence models 230 using any type of machine learning technique, including supervised back-propagation techniques, unsupervised clustering techniques, or semi-supervised techniques. The artificial intelligence models 230 can be trained to receive the transformed features 225 as input, and generate a predicted alert class 245 (e.g., a classification of a vehicle event as a collision event or a non-collision event, and the classification of the sub-class of the collision or non-collision event).

Once the artificial intelligence models 230 have been trained (e.g., using the techniques described in connection with FIG. 3), the transformed features 225 can be stored as the real-time data 240 in the memory of the cloud computing system 255, and provided to the artificial intelligence models 230 as input. The cloud computing system 255 can execute the artificial intelligence models 230 (e.g., using the techniques described in connection with FIG. 3) to generate the predicted event class 245. The predicted event class 245 can include a classification of the vehicle event as a collision event or a non-collision event, and also includes a classification of the sub-class of the collision or non-collision event. If the predicted event class 245 indicates that the vehicle event was a collision, the cloud computing system 255 can generate a notification indicating the collision event, the time of the collision event, and the sub-class of the collision event, and transmit the notification to the vehicle event detection system 205. The vehicle event detection system 205 can receive the notification, and notify the operator of the vehicle with a corresponding alert. A record of the notification alert can be stored as part of the alerts 205 in the storage.

In some implementations, the predicted event class 245 can be provided to a failure mode analysis system that performs failure mode analysis process. Failure mode analysis can be performed on the generated sub-classes of collision events that result in the highest number of misclassifications. The misclassifications are identified (e.g., using manual review processes, feedback from vehicle operators, or other processes) and used as feedback towards feature engineering and model tuning. Feature engineering and model tuning can include, for example, changing of model type, changing model hyperparameters, or selecting which features to generate and provide as input to the artificial intelligence models 130, among others. The results of the failure mode analysis are then utilized to modify or adjust the training process of the artificial intelligence models 130.

Figure 3:
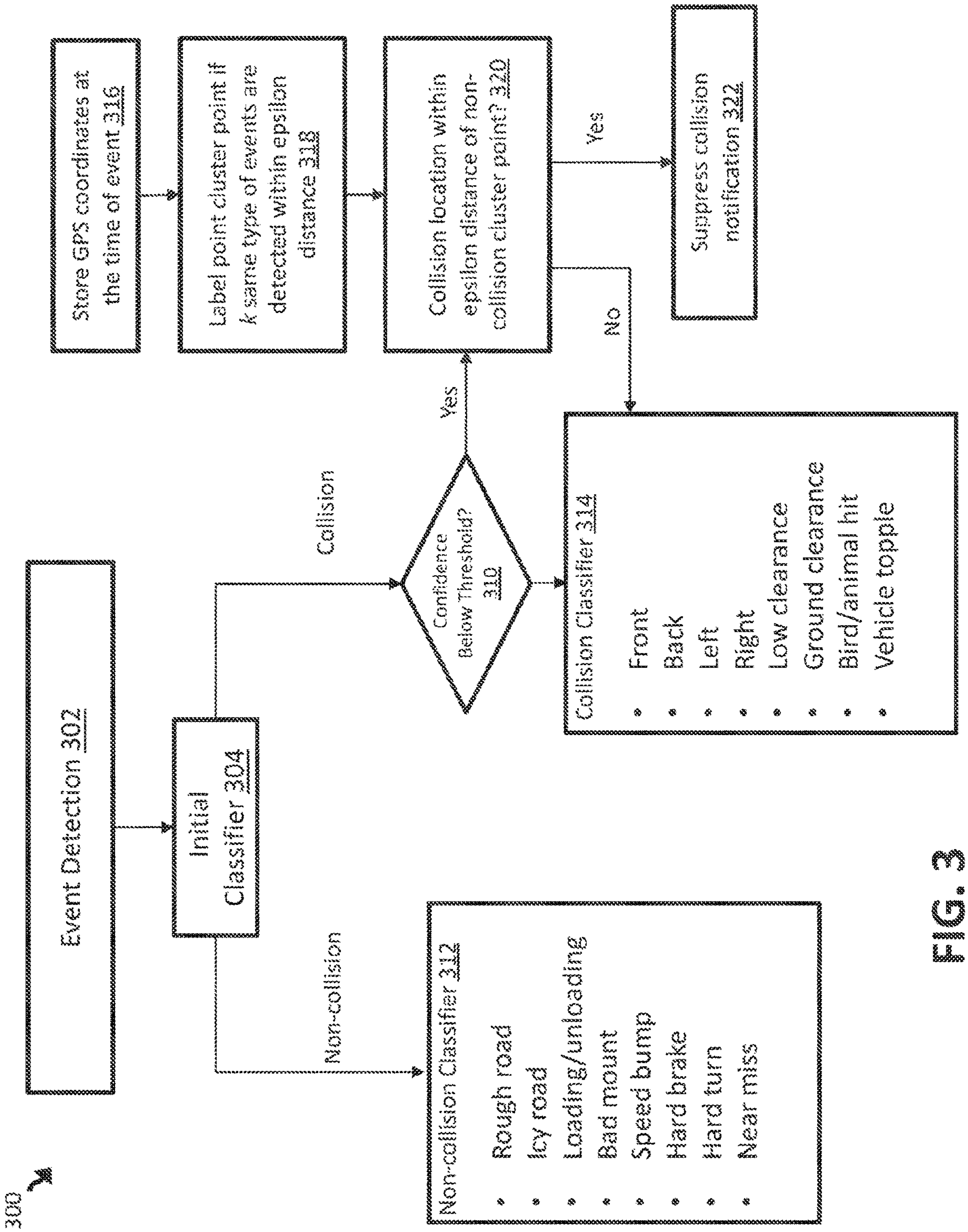
FIG. 3 illustrates a data flow diagram of operations for detecting and classifying vehicle collision and non-collision events, according to an embodiment.

Referring to FIG. 3 in the context of some components of FIGS. 1 and 2, illustrated is a data flow diagram 300 including operations for detecting and classifying vehicle collision and non-collision events, which may be implemented by the components of the system 100 or the environment 200 described in connection with FIG. 2. The operations or components of the flow diagram 300 can be performed or executed, for example, by the computing device 115 or the cloud computing system 155 described in connection with FIGS. 1 and 2, or by a combination of the computing device 115 and the cloud computing system 155. The data flow diagram 300 includes an event detection process 302, an initial classifier 304, a non-collision classifier 312, a collision classifier 314, storage of GPS coordinates in step 316, cluster point labeling in step 318, event suppression detection in step 320, and notification suppression in step 322.

At the start of the flow diagram 300, vehicle event detection process 302 can be performed. The vehicle event detection process 302 can include performing any of the operations described in connection with FIG. 2, including the comparison of sensor data 122 to one or more predetermined thresholds. For example, inertial sensor data measurements can be compared to a predetermined threshold. If the inertial sensor measurements exceed the threshold, a vehicle event can be detected, and a feature extraction process, such as the feature extraction process 218, can be performed on the sensor data 122. The feature extraction process 218 can generate inertial features 225A, GPS speed features 225B, and vehicle class information 225C (e.g., the features 225). The features 225 can be extracted for a number of time windows 215 in the sensor data 122, as described herein. Upon extracting the features that correspond to the vehicle event, the features can be provided as input to the initial classifier 304.

The initial classifier 304 can be part of the artificial intelligence models 130 described in connection with FIGS. 1 and 2. The initial classifier 304 can be any type of machine-learning model that has been trained to receive the features 225 (e.g., which may be transformed features 225 as described in connection with FIG. 2) as input and generate an output indicating whether the vehicle event corresponding to the features 225 is likely a collision event or a non-collision event. The initial classifier 304 can be any type of classification model that may be trained using supervised, unsupervised, or semi-supervised machine learning techniques. For example, the initial classifier can include a LightBGM model, an XGBoost model, a Naïve Bayes classifier, a logistic regression classifier, a neural network, an SVM classifier, a random forest classifier, and/or a decision tree classifier, among others.

The initial classifier 304 can be trained prior to performing the operations of the flow diagram 300, for example, using a supervised learning process. The initial classifier 304 can be trained using historic records of vehicle events, and features extracted therefrom (e.g., the historical data 265). The initial classifier 304 can include any number of layers, such as fully connected layers, convolutional layers, activation layers, softmax layers, or other types of neural network layers. The initial classifier 304 can be executed over input data, such as the transformed features 225, by propagating the data structures including the input data through each layer of the initial classifier 304 until one or more output values are generated.

The output values for the initial classifier 304 can indicate, for example, whether the detected vehicle event is a collision or a non-collision. The initial classifier 304 may be further trained to generate a confidence value, which may indicate the likelihood that the prediction of the collision or the non-collision is accurate. The confidence value can be a scalar value, such as a decimal number ranging from zero, indicating minimal confidence of accuracy, to one, indicating maximum confidence of accuracy. The output of the initial classifier 304 can be used to determine whether to execute the non-collision classifier 312 or the collision classifier 314. The output of the initial classifier 304 can be stored in association with the transformed features 225 of the vehicle event detected in 302.

The initial classifier 304 can be trained using any type of machine learning technique, including supervised backpropagation techniques, unsupervised clustering techniques, or semi-supervised techniques. In the case of supervised backpropagation techniques, the initial classifier can be iteratively executed over sets of training data (e.g., features in the historical data 265) to generate one or more output values for each item of training data. The output values can be compared to the ground-truth values of the training data using a loss function, which can be minimized by updating the weights, biases, or other trainable parameters of the initial classifier 304. The initial classifier 304 can be trained until a predetermined training termination condition has been met. For example, the termination condition may be an accuracy threshold, that when exceeded, terminates training of the model. Accuracy of the initial classifier 304 can be determined by using a set of test data.

The training data (e.g., the historical data 265) used to train the initial classifier 304 may be prepared or preprocessed prior to initiating a training process. Generally, it is important to utilize training data (and model hyperparameters) that will result in the highest accuracy possible. Generally, a higher sample weight can be utilized for more recent data, and a lower sample weight can be utilized for older data while training. This effectively places importance on recently captured data, which can reduce data drift problems. Additional techniques may also be used to prepare training data for use in training the initial classifier 304. For example, a synthetic minority oversampling technique (SMOTE) process can be implemented to increase examples from minority classes. Because certain vehicle events may be infrequent, SMOTE techniques can be used to increase the amount of training data for those minority cases in a balanced way, without sacrificing model accuracy. Techniques may also be implemented to ensure the ground-truth labels for the training data are accurate. For example, training data for which video is inconclusive may be filtered from the historical data 265 for training purposes.

When training the initial classifier 304, various techniques may be utilized to improve the accuracy of the training process. One process that can be used to improve the training process is biased sampling. Biased sampling of predicted non-accident events can be performed to accumulate rich data with high proportion of "hard" (e.g., near boundary) examples, which can improve the training process by exposing the initial classifier 304 to more near-boundary cases during training. The biased sampling process can first include labeling all of the predicted vehicle events (e.g., the predictions of a collision or non-collision generated during training) in the historical data 265 using a labeling process, as described herein. Then, the labeled predicted non-collision events can be sorted in descending order of collision probability (e.g., confidence value). Then, a random sample S of the test cases can be sampled from the ordered set based on the labeling capacity. The random sample S can then be utilized in further training procedures, or utilized in SMOTE procedure to generate additional hard training cases.

Biased sampling, among other techniques to train the initial classifier 304, is important, because generally non-collision events occur much more frequently than collision events during normal vehicle operation, making collision events a minority class. As such, to label the maximum possible such predictions, while at the same time optimizing the labeling process by not labeling all the non-collision events. Biased sampling achieves a significantly higher hit rate of minority classes even with a very small sample size, which in turn enables the generation of a rich dataset with a high number of minority class examples and with a significantly low labeling cost.

Once the initial classifier 304 has been trained, the initial classifier 304 can be utilized to predict whether the features extracted from sensor data that indicates a vehicle event corresponds to a non-collision or a collision. To do so, the transformed features 225 can be provided to the input layer of the trained initial classifier 304. The initial classifier 304 can be then executed over the input data by propagating the data structures including the input data through each layer of the initial classifier 304 until one or more output predictions are generated, which can also include the confidence value indicating the predicted accuracy of the non-collision or the collision prediction. The prediction of whether the vehicle event corresponds to a non-collision or the collision can be stored in association with the features 225 associated with the vehicle event.

If the prediction for the vehicle event is classified as a non-collision event, the features 225 (e.g., which may have undergone a transformation process 230) can be provided as input to the non-collision classifier 312. Otherwise, if the prediction for the vehicle event is classified as a collision event, the confidence value (e.g., generated by the initial classifier 304) of the predicted collision event can be compared to a predetermined confidence threshold. If the confidence value of the predicted collision event is below a threshold, the collision event can be considered for potential suppression in step 320. However, if the confidence value of the predicted collision event is greater than or equal to the threshold, the features 225 (e.g., which may have undergone a transformation process 230) can be provided as input to the collision classifier 314. The confidence threshold may be predetermined based on previously analyzed collision data. For example, a "precision-recall" curve may be generated, and an "elbow" may be identified therein, whereby events having a confidence above the elbow have a high precision and acceptable recall, whereas events having a confidence below the elbow may have higher recall but unacceptable precision. The predetermined threshold and subsequent processing may then be a technique to increase the recall of collision event detection while still providing acceptable precision.

The non-collision classifier 312 and the collision classifier 314 can each be any type of machine-learning model that has been trained to receive the features 225 (e.g., which may be transformed features 225 as described in connection with FIG. 2) as input and generate an output indicating a sub-class. The non-collision classifier 312 can generate a prediction of a non-collision sub-class, can include a rough road, an icy road, loading or unloading, a bad mount, a speed bump, a hard brake, a hard turn, or a near miss, among others. The collision classifier 314 can generate a prediction of a collision subclass, which can include a front-end collision, a rear-end (e.g., a back-end) collision, a left collision, a right collision, a low-clearance (e.g., top) collision, a ground clearance collision (e.g., an undercarriage collision), a bird or animal collision, or a vehicle topple event, among others. The prediction of the collision subclass may improve the accuracy of types of notifications generated and sent to the driver, which may in turn facilitate faster and more accurate "first notice of loss" reporting. Further, all the collision subclasses may not be critical to raise an alert to the emergency services.

Upon generation of the prediction of the collision or a non-collision subclass, a notification/alert can be generated based on the non-collision or collision subclass. The notification is provided to the alert device and/or to the mobile device upon determination that the confidence value of the predication is greater than the threshold. The notification may include a type of subclass and in some scenarios, the notification may further include a query and requests a response from the driver. The query may be displayed on the mobile device of the driver or can be an audio query that requires a voice response from the driver. For example, upon prediction of a vehicle topple subclass, an alert can be generated indicating the vehicle topple subclass and the alert may further include a query related to the subclass prediction. The alert may further include queries related to any help required if the predication of the subclass is accurate or true. In some embodiments, an alert is sent to emergency services upon prediction of an event subclass (such as vehicle topple). In addition to providing the notification to the driver, the notification can also be stored in the cloud computing system.

The non-collision classifier 312 and the collision classifier 314 can each be any type of classification model that may be trained using supervised, unsupervised, or semi-supervised machine learning techniques. For example, the initial classifier can include a LightBGM model, an XGBoost) model, a Naïve Bayes classifier, a logistic regression classifier, a neural network, an SVM classifier, a random forest classifier, and a decision tree classifier, among others. Like the initial classifier 304, the non-collision classifier 312 and the collision classifier 314 can each be trained prior to performing the operations of the flow diagram 300, for example, using a supervised learning process.

The non-collision classifier 312 and the collision classifier 314 can each be trained using historic records of vehicle events, and features extracted therefrom (e.g., the historical data 265). The non-collision classifier 312 and the collision classifier 314 can each include any number of layers, such as fully connected layers, convolutional layers, activation layers, softmax layers, or other types of neural network layers. In some implementations, the non-collision classifier 312 and the collision classifier 314 may include a different number, or different types, of layers, hyperparameters, or trainable parameters. The non-collision classifier 312 and the collision classifier 314 can each be executed over input data, such as the transformed features 225, by propagating the data structures including the input data through each layer of non-collision classifier 312 or the collision classifier 314 until one or more output values are generated.

The non-collision classifier 312 and the collision classifier 314 can each be trained using any type of machine learning technique, including supervised backpropagation techniques, unsupervised clustering techniques, or semi-supervised techniques. In the case of supervised backpropagation techniques, the non-collision classifier 312 or the collision classifier 314 can be iteratively executed over sets of training data (e.g., features in the historical data 265) to generate one or more output values for each item of training data. The output values can be compared to the ground-truth values (e.g., the actual sub-class of the collision or the non-collision event) of the training data using a loss function, which can be minimized by updating the weights, biases, or other trainable parameters of the non-collision classifier 312 or the collision classifier 314. The non-collision classifier 312 or the collision classifier 314 can be trained until a predetermined training termination condition has been met.

The training data (e.g., the historical data 265) used to train the non-collision classifier 312 and the collision classifier 314 may be prepared or pre-processed prior to initiating a training process. For example, a SMOTE process can be implemented to increase examples from minority classes, such as collision event or non-collision event sub-classes that occur least frequently. Techniques may also be implemented to ensure the ground-truth labels for the training data is accurate, as described herein. Additional techniques may also be used to prepare training data for use in training the non-collision classifier 312 or the collision classifier 314. For example, class weight adjustments may be performed to fine tune false positives and false negatives for individual or collision non-collision subclasses. In some implementations, biased sampling may be used (as described herein) to curate training data for each of the non-collision classifier 312 and the collision classifier 314.

After training the non-collision classifier 312 and the collision classifier 314, the non-collision classifier 312 and the collision classifier 314 can be utilized to predict the sub-class of the previously classified collision or non-collision vehicle event using the features 225 as input. To do so, the transformed features 225 can be provided to the input layer of the non-collision classifier 312 or the collision classifier 314. The non-collision classifier 312 or the collision classifier 314 can then executed over the input data by propagating the data structures including the input data through each layer of the respective classifier until one or more output predictions are generated. In some implementations, the non-collision classifier 312 and the collision classifier 314 can each be trained to output a confidence value, similar to the confidence value of the initial classifier 304, which indicates the confidence that the predicted sub-class is accurate. The predicted sub-class of the non-collision or collision event can be stored in association with the features 225 associated with the vehicle event. If the predicted sub-class corresponds to a collision event, a notification can be generated and provided to an alert device of the vehicle (e.g., the vehicle 110) that provided the sensor data. In some implementations, the initial classifier 304 may not be used, and the non-collision classifier 312 and the collision classifier 314 can instead be a single classification model that is trained to receive features 225 as input and generate sub-classes of both non-collision and collision events as output.

The classified events (e.g., including the sub-class) can be utilized to suppress potential false-positive collision events. For example, at step 316, the GPS coordinates of a collision event or a non-collision event (including the predicted sub-class of the event) can be stored in association with a timestamp of the event, for example, in a vehicle event database. The classified vehicle events in the vehicle event database can be utilized to suppress incorrectly false-positive collision classifications by using historical geospatial information indicating hotspots of routine or repetitive activities involving non-collision events, such as loading or unloading at a warehouse, vehicle maintenance at a mechanic or service center, railroad crossing indicating a bumpy road, or speed bump crossing, among others. Similarly, a locally stored non-collision event database may enable more accurate event classification where a particular vehicle typically travels. In addition, a locally stored vehicle event database may incorporate detections from other similarly enabled vehicles, either directly or via a common cloud server.

After storing GPS coordinates and timestamps of several classified vehicle events, a clustering algorithm can be used to cluster groupings of similar vehicle events that are detected within an epsilon distance at step 318. To do so, an iteration process can be performed through each of the detected vehicle events, and the vehicle event can be labeled as a cluster point if k same type of events (e.g., collision or non-collision, or in some implementations the same sub-class of collision or non-collision) are detected within the epsilon distance. The label can be stored in association with the vehicle event in the database, and used to potentially suppress potentially false-positive collision events. Clustering events at the level of an event sub-class may enable higher recall of collision events because the features associated with a given vehicle event may not correspond to features associated with a non-collision subclass, even when a different non-collision subclass may be common in the area.

Figure 6:
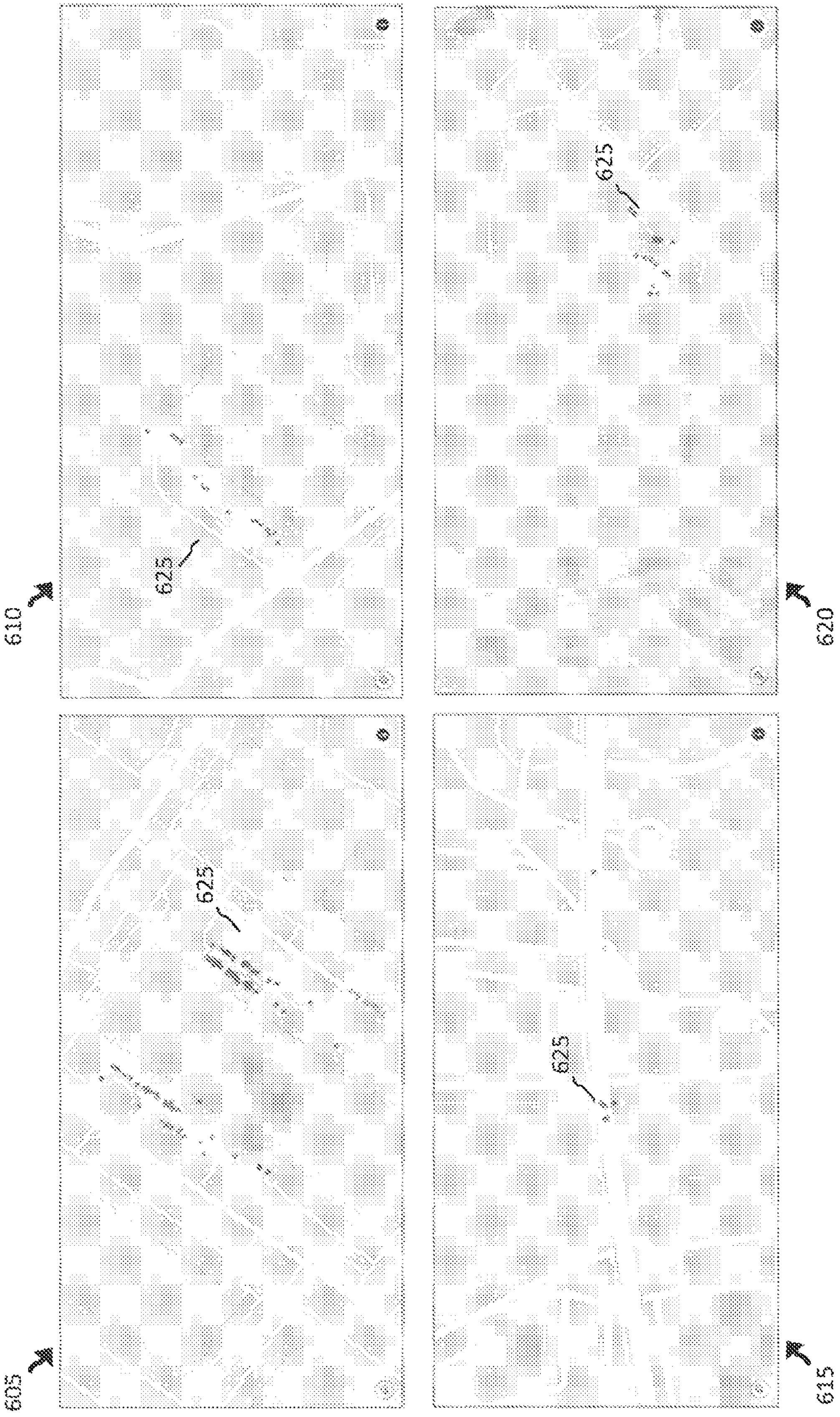
FIG. 6 shows various examples of different clusters generated from false-positive collision events, according to an embodiment.

Examples of cluster points for different types of non-collision events are shown in FIG. 6. Referring to FIG. 6, depicted various examples of different clusters generated from false-positive collision events, according to an embodiment. As shown in the image 605, several cluster points 625 are shown surrounding the building of a warehouse. The cluster points 625 in the image 605 correspond to the loading or unloading non-collision sub-class. The image 610 depicts a similar scenario, with several cluster points 625 detected around a packaging center. Like in the image 605, the cluster points 625 in the image 610 also correspond to the loading or unloading non-collision sub-class. The image 615 depicts a railroad crossing, which shows a hotspot of cluster points 625 detected as a railroad crossing non-collision event, and the image 620 shows an unpaved road with cluster points 625 having the rough road classification. Each of these hotspots can be utilized to potentially suppress false-positive collision events, as described herein.

Referring back to FIG. 3, and as described herein, the confidence value of vehicle events that are classified as collision events by the initial classifier 304 can be compared to a threshold at 310. If the confidence of that the vehicle event corresponds to the collision event is low, the location (e.g., the GPS coordinates) of the vehicle event can be compared to one or more proximate cluster points as indicated in the vehicle event database at step 320. If one or more cluster points are within an epsilon distance of the location of the collision event, then the collision event is likely a false-positive collision event, and the collision notification can be suppressed at step 322. Suppressing the collision notification can include not transmitting an alert to the vehicle, and instead storing a record of the false-positive collision classification. In some implementations, the false-positive collision events can be utilized to further train the initial classifier 304, to improve the overall accuracy of the initial classifier and the systems described herein. Additionally, using similar techniques, records of collision events can be stored in the vehicle event database and utilized to notify drivers of accident-prone regions, for example, as the driver approaches said regions.

Figure 7:
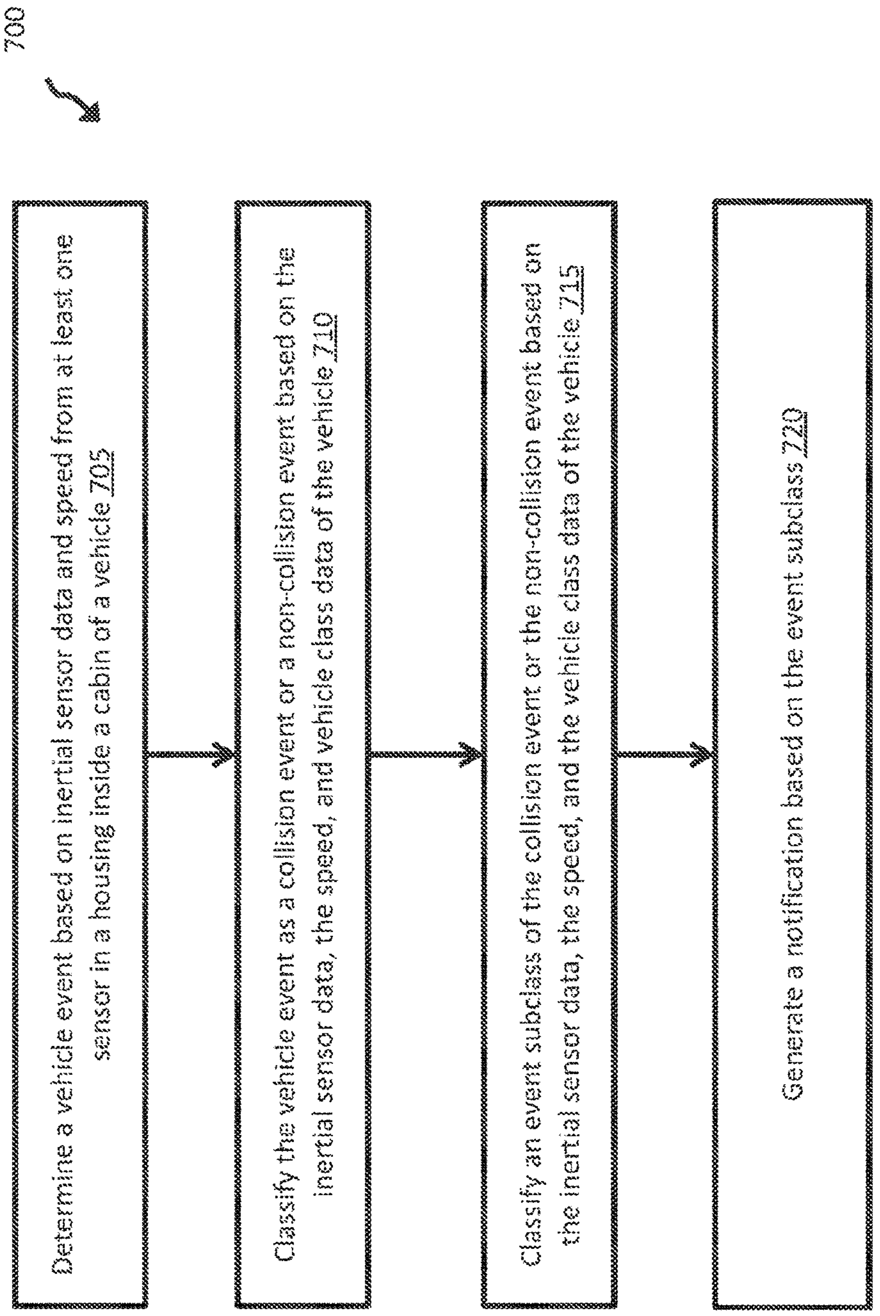
FIG. 7 illustrates a flow of a method executed in a system for detecting and classifying vehicle collision and non-collision events, according to an embodiment.

FIG. 7 illustrates a flow of a method 700 executed in a system (e.g., the vehicle event detection system 105, the cloud computing system 155, combinations thereof, etc.) for detecting and classifying vehicle collision and non-collision events, in accordance with an embodiment. The method 700 includes steps 705-520. However, other embodiments may include additional or alternative steps, or may omit one or more steps altogether. The method 700 is described as being executed by a computing device, such as the computing device 115, the cloud computing system 155, or combinations therefore, as described herein.

Step 705 of the method 700 can include determining a vehicle event based on inertial sensor data and speed from at least one sensor in a housing inside a cabin of a vehicle. Determining a vehicle event can include identifying a time period or time window (e.g., a time window 215 described in connection with FIG. 2) during which the vehicle event occurred based on timestamps corresponding inertial sensor data (e.g., the sensor data 122) captured by sensors (e.g., the sensors 135 of FIG. 1) of a vehicle (e.g., the vehicle 110 of FIG. 1). To do so, the techniques described in connection with FIGS. 1 and 2 can be performed, which may include comparing one or more sensor measurements to a predetermined threshold. Then, using the techniques described herein, sensor data from time windows preceding, during, and following the measurement that exceeded the threshold can be extracted and utilized to classify the vehicle event.

Step 710 of the method 700 can include classifying the vehicle event as a collision event or a non-collision event based on the inertial sensor data, the speed, and vehicle class data of the vehicle. As described in connection with FIGS. 2 and 3, the inertial sensor data, the speed, and vehicle class data of the vehicle can be used in an initial classification process. The classification process can include generating a set of features (e.g., the features 225) by executing a feature extraction process using the inertial sensor data or the speed captured during each extracted time window. The feature extraction process can include a wavelet transform function, which may generate wavelet transforms similar to those plotted in FIG. 5. The extracted features can then be provided as input to a classification model (e.g., the initial classifier 304) to classify the corresponding vehicle event as a collision event or a non-collision event. To do so, the techniques described in connection with FIG. 3 can be performed. In addition to the classification of the vehicle event, a confidence value can be generated that indicates the accuracy of the respective prediction, as described herein.

At step 715 of the method 700 can include classifying an event subclass of the collision event or the non-collision event based on the inertial sensor data, the speed, and the vehicle class data of the vehicle. As described in connection with FIG. 3, upon a classification of a collision event or a non-collision event, a corresponding classifier model can be utilized to determine a sub-class of the collision or non-collision event. The sub-classes of a collision event can include a front collision, a rear collision, a left collision, a right collision, a low-clearance collision, a bird or animal collision, or a topple event. The sub-classes of a non-collision event can include a rough road, an icy road, loading or unloading of the vehicle, a bad mount, a speed bump, a hard brake, a hard turn, or a near miss.

At step 720 of the method 700 can include generating a notification based on the event subclass. The notification can include an indication of the vehicle event, the classification of the vehicle event, and the sub-class of the vehicle event. The notification can then be transmitted to the vehicle (e.g., to an alert device of the vehicle) to indicate the event subclass to an operator of the vehicle. The classifications of non-collision events can be utilized to suppress notifications of potentially false-positive collision events. To do so, the techniques described in connection with FIG. 3 can be performed. For example, one or more regions (e.g., epsilon distance of cluster points) within which vehicle events are to be classified as non-collision events can be identified by executing a clustering function over the location data of classified non-collision events. Then, when a collision event are detected, and it is determined the collision event has a confidence level below a threshold and is located within the region, notifications corresponding to that collision event can be suppressed, as described herein. Additionally, classifications of other non-collision events can be used to update the region by storing the non-collision event as an additional cluster point.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The operations described in this specification can be implemented as operations performed by a data processing apparatus on data stored on one or more computer-readable storage devices or received from other sources.

The terms "data processing apparatus", "data processing system", "client device", "computing platform", "computing device", "computing system", "user device", or "device" can encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a GPS receiver, a digital camera device, a video camera device, or a portable storage device (e.g., a universal serial bus (USB) flash drive), for example. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD monitor, for displaying information to the user; a keyboard; and a pointing device, e.g., a mouse, a trackball, or a touchscreen, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the computing devices described herein can each be a single module, a logic device having one or more processing modules, one or more servers, or an embedded computing device.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method (300) of detecting a vehicle collision, comprising:

receiving, by at least one processor, vehicle class data of a vehicle (110), and inertial sensor data and speed from at least one sensor (135) in a housing inside a cabin of the vehicle (110);

detecting (302), by the at least one processor, a vehicle event based on the inertial sensor data and the speed;

processing (304), by the at least one processor, the inertial sensor data, the speed, and vehicle class data of the vehicle with an initial classifier to generate an indication that the detected vehicle event is a collision event or a non-collision event, wherein the indication comprises an initial collision classification confidence value;

in response to generating an indication that the detected vehicle event is a collision event, comparing (310), by the at least one processor, the initial collision classification confidence value with a predefined confidence threshold;

in response to a determination that the initial collision classification confidence value is below the predefined confidence threshold, determining (320) by the at least one processor whether a location of the vehicle associated with the detected event is within a distance of a non-collision cluster point, wherein the non-collision cluster point is within a region identified by executing a clustering technique using a plurality of vehicle events;

determining, by the at least one processor, whether the vehicle event corresponds to a non-collision event based on the location of the vehicle being within the region;

in response to a determination that the location of the vehicle (110) is not within a distance of a non-collision cluster point, classifying (314), by the at least one processor, an event subclass of the collision event based on the inertial sensor data, the speed, and the vehicle class data of the vehicle;

generating, by the at least one processor, a notification based on the event subclass; and suppressing, by the at least one processor, the notification if the vehicle event is determined to correspond to the non-collision event based on the location of the vehicle being within the region.

2. The method of claim 1, wherein detecting (302) the vehicle event comprises identifying, by the at least one processor, a time period during which the vehicle event occurred based on the inertial sensor data.

3. The method of claim 2, further comprising:

generating, by the at least one processor, a set of features by executing a feature extraction function using at least one of the inertial sensor data or the speed captured during the time period; wherein generating the indication that the detected vehicle event is a collision event or the non-collision event is based on the set of features.

4. The method of claim 3, wherein the feature extraction function comprises a wavelet transform function.

5. The method of claim 4, wherein the wavelet transform function is applied to each of four time windows, wherein the four time windows comprise a center time window (412), a prior time window (407), a later time window (420), and a non-event time window (405).

6. The method of claim 1, wherein the collision event comprises at least one of a front collision, a rear collision, a left collision, a right collision, a low-clearance collision, a bird or animal collision, or a topple event.

7. The method of claim 1, further comprising updating, by the at least one processor, a size of the region in response to detecting further non-collision events within or proximate to the region.

8. The method of claim 1, further comprising transmitting, by the at least one processor, the notification to the vehicle to indicate the event subclass to an operator of the vehicle.

9. The method of claim 8, wherein the notification is transmitted in response to classifying the vehicle event as the collision event.

10. The method of claim 9, wherein the event subclass indicates that the vehicle toppled, and the method further comprises transmitting the notification to an emergency services operator.

11. A system (105) for detecting a vehicle collision, comprising: at least one processor coupled to a non-transitory memory, the at least one processor configured to:

detect a vehicle event based on inertial sensor data and speed from at least one sensor in a housing inside a cabin of a vehicle;

process the inertial sensor data, the speed, and vehicle class data of the vehicle with an initial classifier to generate an indication that the detected vehicle event is a collision event or a non-collision event, wherein the indication comprises an initial collision classification confidence value;

in response to generating an indication that the detected vehicle event is a collision event, compare (310) the initial collision classification confidence value with a predefined confidence threshold;

in response to a determination that the initial collision classification confidence value is below a predefined confidence threshold, determine (320) whether a location of the vehicle associated with the detected event is within a distance of a non-collision cluster point, wherein the non-collision cluster point is within a region identified by executing a clustering technique using a plurality of vehicle events;

in response to a determination that the location of the vehicle is not within a distance of a non-collision cluster point, classify an event subclass of the collision event or the non-collision event based on the inertial sensor data, the speed, and the vehicle class data of the vehicle;

update a size of the region in response to detecting further non-collision events within or proximate to the region; and generate a notification based on the event subclass.

12. The system of claim 11, wherein the at least one processor is further configured to detect the vehicle event by performing operations comprising identifying a time period during which the vehicle event occurred based on the inertial sensor data.

13. The system of claim 12, wherein the at least one processor is further configured to:

generate a set of features by executing a feature extraction function using at least one of the inertial sensor data or the speed captured during the time period; and wherein generating the indication that the detected vehicle event is a collision event is based on the set of features, and wherein the feature extraction function comprises a wavelet transform function.

14. The system of claim 11, wherein the collision event comprises at least one of a front collision, a rear collision, a left collision, a right collision, a low-clearance collision, a bird or animal collision, or a topple event.

15. The system of claim 11, wherein the at least one processor is further configured to:

determine whether the vehicle event corresponds to a non-collision event based on the location of the vehicle being within the region.

16. The system of claim 11, wherein the at least one processor is further configured to transmit the notification to the vehicle to indicate the event subclass to an operator of the vehicle.

17. A non-transitory computer-readable medium comprising instructions which, when executed by a computer, cause the computer to carry out the steps of the method of:

receiving, by at least one processor, vehicle class data of a vehicle (110), and inertial sensor data and speed from at least one sensor (135) in a housing inside a cabin of the vehicle (110);

detecting (302), by the at least one processor, a vehicle event based on the inertial sensor data and the speed;

processing (304), by the at least one processor, the inertial sensor data, the speed, and vehicle class data of the vehicle with an initial classifier to generate an indication that the detected vehicle event is a collision event or a non-collision event, wherein the indication comprises an initial collision classification confidence value;

in response to generating an indication that the detected vehicle event is a collision event, comparing (310), by the at least one processor, the initial collision classification confidence value with a predefined confidence threshold;

in response to a determination that the initial collision classification confidence value is below the predefined confidence threshold, determining (320) by the at least one processor whether a location of the vehicle associated with the detected event is within a distance of a non-collision cluster point, wherein the non-collision cluster point is within a region identified by executing a clustering technique using a plurality of vehicle events;

determining, by the at least one processor, whether the vehicle event corresponds to a non-collision event based on the location of the vehicle being within the region;

in response to a determination that the location of the vehicle (110) is not within a distance of a non-collision cluster point, classifying (314), by the at least one processor, an event subclass of the collision event based on the inertial sensor data, the speed, and the vehicle class data of the vehicle;

generating, by the at least one processor, a notification based on the event subclass; and suppressing, by the at least one processor, the notification if the vehicle event is determined to correspond to the non-collision event based on the location of the vehicle being within the region.

* * * * *